United States Patent
Park

(10) Patent No.: US 6,988,465 B2
(45) Date of Patent: Jan. 24, 2006

(54) AUTOMATIC PET FOOD DISPENSING DEVICE

(76) Inventor: Sung Ho Park, 14730 Willow Creek La., Chino Hills, CA (US) 91709

(*) Notice: Subject to any disclaimer, the term of this patent is extended or adjusted under 35 U.S.C. 154(b) by 0 days.

(21) Appl. No.: 10/620,662

(22) Filed: Jul. 16, 2003

(65) Prior Publication Data

US 2005/0011465 A1   Jan. 20, 2005

(51) Int. Cl.
   *A01K 5/02*   (2006.01)
(52) U.S. Cl. .................................. 119/51.12; 119/57.1
(58) Field of Classification Search ............ 119/51.02, 119/57.1, 57.5, 51.11, 57.92, 51.12, 56.1; A01K 39/00, A01K 5/02
See application file for complete search history.

(56) References Cited

U.S. PATENT DOCUMENTS

| | | | |
|---|---|---|---|
| 1,274,548 A | 8/1918 | Holnagel et al. | |
| 2,677,350 A | 5/1954 | Prestidge et al. | |
| 4,665,862 A | 5/1987 | Pitchford, Jr. | 119/51.11 |
| 4,735,171 A * | 4/1988 | Essex | 119/51.12 |
| 4,922,857 A * | 5/1990 | Arentoft | 119/51.12 |
| 5,031,575 A | 7/1991 | Phillips | 119/61 |
| 5,199,381 A * | 4/1993 | Masopust | 119/51.04 |
| 5,363,805 A | 11/1994 | Wing | 119/51.11 |
| 5,647,299 A | 7/1997 | Pearson-Falcon | 119/61 |
| 5,775,255 A | 7/1998 | Louviere, III | 119/51.5 |
| 5,979,360 A * | 11/1999 | Tharp | 119/51.5 |
| 6,135,056 A | 10/2000 | Kuo | 119/51.11 |
| 6,192,831 B1 | 2/2001 | Brunse | 119/51.5 |
| 6,401,657 B1 | 6/2002 | Krishnamurthy | 119/51.11 |

FOREIGN PATENT DOCUMENTS

| | | | |
|---|---|---|---|
| DE | 3112743 A1 | * | 10/1982 |
| DE | 29714072 U1 | * | 10/1997 |
| DE | 19750074 C1 | * | 3/1999 |
| FR | 2599722 A1 | * | 12/1987 |

* cited by examiner

*Primary Examiner*—Michael J. Carone
*Assistant Examiner*—Susan C. Alimenti
(74) *Attorney, Agent, or Firm*—Christie, Parker & Hale, LLP.

(57) ABSTRACT

An automatic pet food dispensing device having a container that stores pet food, a circular pipe attached below the container, a dispenser rotatably received in the circular pipe, a motor that rotates the dispenser, and one or more dispensing spouts connected to the circular pipe is provided. The dispenser includes a shaft with a rectangular cross section and two or more circular dispensing discs fixed to the shaft, and each of the dispensing discs has an arc recess positioned opposite of each other. The dispensing discs have evenly spaced grooves cut out around the circumference of each disc and evenly spaced convex bumps slightly protruding upward.

18 Claims, 5 Drawing Sheets

AUTOMATIC PET FOOD DISPENSING DEVICE

BACKGROUND OF THE INVENTION

The present invention relates to an improved automatic pet food dispensing device. More particularly, this invention relates to an automatic pet food dispensing device that will prevent over or underfeeding of pets and food from jamming in the feeder.

Automatic pet food dispensing devices are widely used to feed pets and animals, especially when the pet owner is away from the pet for a period of time. The diet of pets and animals is important to the their health. In order to control the diet, quantity and timeliness of feeding should be considered. Automatic pet food dispensing devices allow pets to be fed regularly and in controlled amounts.

It has been difficult for pet owners to regularly feed their pets. Misfeeding occurs in some of the situations as follows:
1) The pet keeper is not able to come home to feed the pet;
2) The pet keeper is away for an extended period of time and requires a pet sitter or a kennel, both of which may be costly to the pet owner;
3) Multiple family members feed the pet at different times and overfeed the pet.

To remedy these situations, numerous pet food dispensers have been provided in the prior art. Examples of automatic pet feeders include U.S. Pat. No. 4,665,862 to Pitchford, Jr.; U.S. Pat. No. 4,735,171 to Essex; U.S. Pat. No. 5,363,805 to Wing; U.S. Pat. No. 6,135,056 to Kuo; and U.S. Pat. No. 6,401,657 to Krishnamurthy. However, each of these feeders is subject to either food jams or crush especially in the in the places where the pet food enters or dispenses due to the use of augers for funneling food.

SUMMARY OF THE INVENTION

The present invention contrives to provide an automatic pet food dispensing device that solves the disadvantages of the prior art.

Accordingly, it is an object of the present invention to provide an automatic pet food dispensing device that prevents the jamming of the feeder by the food.

It is an additional object to provide such a pet food dispensing device that can control the quantity of food given to the pet per feeding.

A further object is to provide an automatic pet food dispensing device that allows for preset definite feeding times and multiple feedings in a single day.

It is a still further object to provide such an automatic pet food dispensing device that is simple to operate and safe for both the pet and the owner.

To achieve the above objectives, an automatic pet food dispensing device includes a container that stores pet food, a circular pipe attached below the container, a dispenser rotatably received in the circular pipe, a motor that rotates the dispenser, and one or more dispensing spouts connected to the circular pipe. The dispenser includes a shaft with a rectangular cross section and two or more circular dispensing discs fixed to the shaft, and each of the dispensing discs has a cut out of predetermined angle of about ninety (90) degrees.

The cut out of the dispensing discs are positioned opposite of each other. The distance between each of the dispensing discs is about one and half (1½) inches.

One end of the shaft is connected to the motor by way of a sleeve. The end of the shaft has a shape of a half circle and the sleeve has a receiving recess that receives the end of the shaft. The receiving recess has a shape of a partially flattened circle so that there is a gap between the end of the shaft and the receiving recess.

The container of the pet food dispensing device has a shape of inverted cone with an upper open end and a lower open end. The lower open end is connected to the circular pipe and the upper open end has a peripheral edge with a cross section that has a shape of a half circle that is opened downward. This blocks intrusion of ants to the pet food.

The container, the circular pipe, the dispenser, the motor, and the dispensing spouts, are all enclosed by a case member that has an open upper top portion with a space between the peripheral edge of the container and the open upper top portion. The case member has one or more hooks where bowls can be attached to the case member with the hooks.

The container further includes an extender to increase pet food containing capacity. The extender includes a fixed annular member and a movable annular member that is received in the fixed annular member when the container is not extended, and extended upward from the fixed annular member when the container is extended.

The automatic pet food dispensing device has a power supply that supplies power to the motor, a timer, a switch and a display. The timer controls the operation time of the motor and the switch sets the timer, while the display displays parameters for setting the timer.

The dispensing discs have evenly spaced grooves cut out around the circumference of each disc. The dispensing discs also have convex bumps protruding upward therefrom.

The advantages of the present invention are an automatic pet food dispensing device that prevents food from jamming in the feeder, easy separation of the parts of the feeder for ease of use and ease of cleaning, timely feeding of the pet, feeding of predetermined quantity of pet food and prevention of ants from reaching the pet food.

Although the present invention is briefly summarized, the above objectives, as well as others, will become apparent upon reference to the following detailed description, accompanying drawings, and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
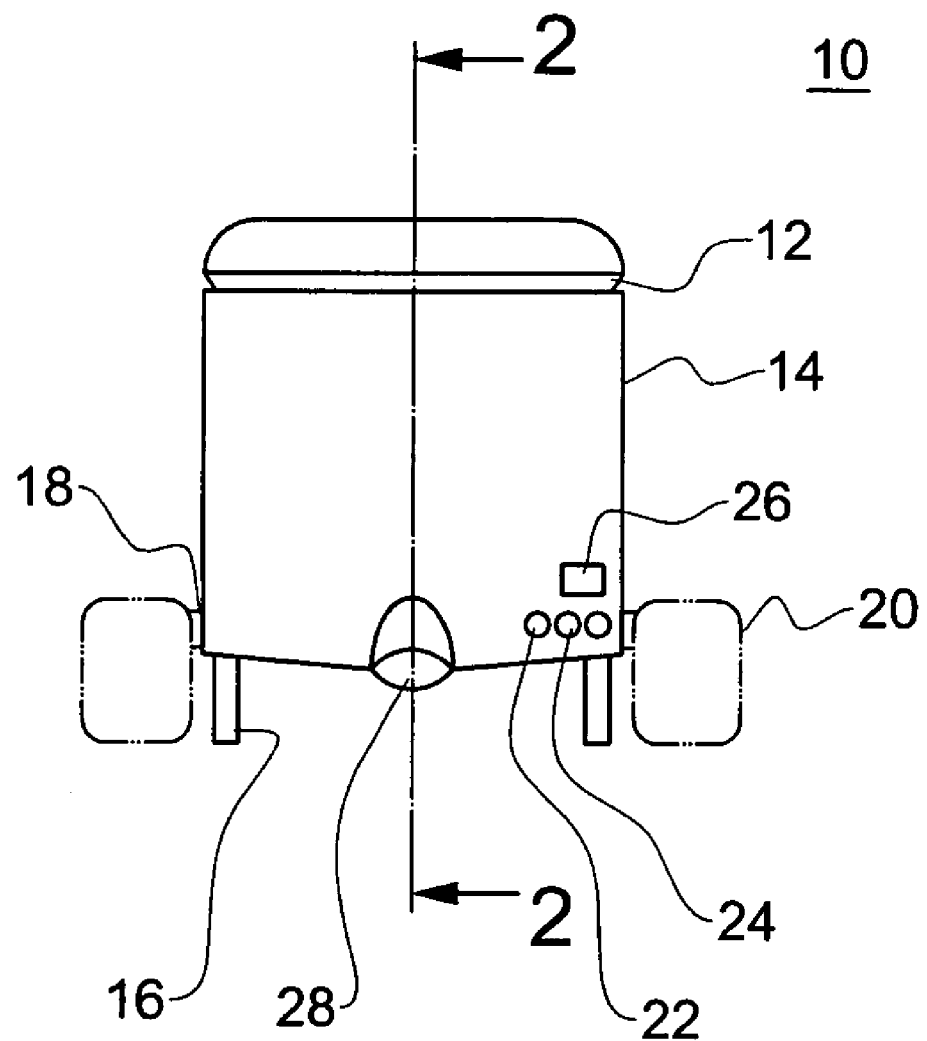
FIG. 1 is a front elevation view of an automatic pet food dispensing device according to the present invention.
Figure 2:
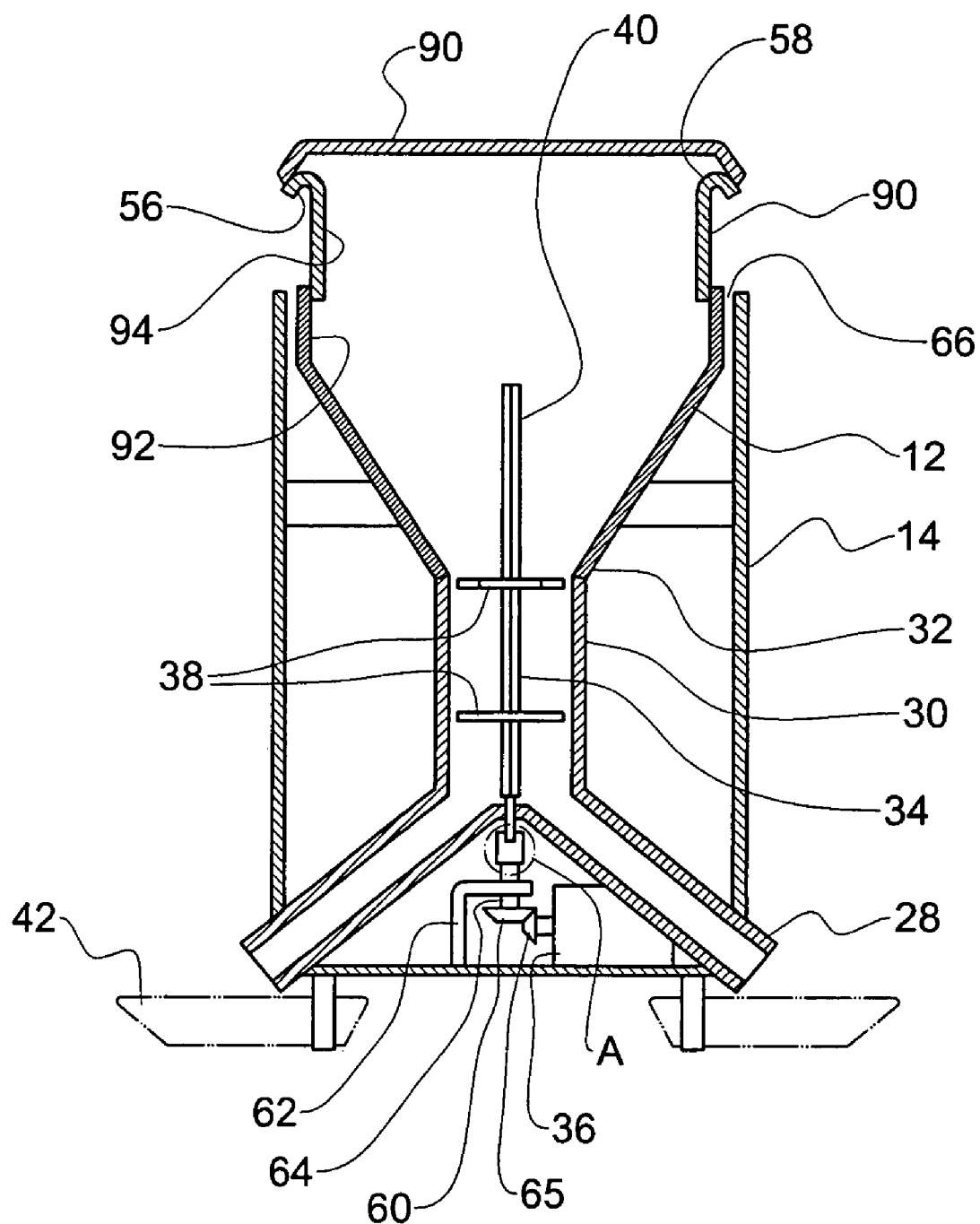
FIG. 2 is a cross-sectional view of the automatic pet food dispensing device taken along line 2—2 of FIG. 1.

FIGS. 1 and 2 show an example of an embodiment of the automatic pet food dispensing device, generally designated as 10, according to the invention.

The pet food dispensing device 10 comprises a container 12 for storing pet food and a case member 14. The container 12 is removably received in the case member 14. The case member 14 is elevated from the ground by legs 16. The case member 14 has dispensing spouts 28 on opposite ends of each other where the pet food is dispensed. The case member 14 has hooks 18 attached on opposite ends on the side adjacent from the sides with the dispensing spouts 28 for attaching bowls 20 for drinking. The case member 14 has a power switch 22 to turn the automatic pet feeder 10 on or off. Positioned adjacent to the power switch 22 are programming buttons 24 for programming the automatic pet feeder 10 to control frequency and quantity of food dispensed into feeding plates 42. A digital display 26 indicates whether the automatic pet feeder 10 is on or off as controlled by the power switch 22 and the programmed times and food quantity as controlled by the programming buttons 24.

The container 12 has the shape of an inverted cone with an open upper end 58 and a lower open end 32 connected to a hollow circular pipe 30. The container may further have an extender 90, which is provided upward from the inverted cone. The extender 90 comprises a fixed annular member 92 and a movable annular member 94 that is received in the fixed annular member 92 when the container 12 is not extended, and extended upward from the fixed annular member 92 when the container 12 is extended. The extender 90 increases the capacity of the container 12 when a large capacity is needed like when the owner of the pet is away for a few days.

The open upper end 58 has a peripheral edge 56 that has a cross-section in the shape of a downward opening half circle. A cover 90 is provided on the upper open end 58. The case member 14 encloses the container 12, the circular pipe 30, a dispenser 34, a motor 36, and the dispensing spouts 28. The peripheral edge 56 of the container 12 is not enclosed by the case member 14 and is spaced from the open upper top portion 66 of the case member 14 to prevent ants from crawling up the case member 14 and into the open upper end 58 of the container 12 and reaching the food inside. The circular pipe 30 rotatably receives the dispenser 34. The motor 36 rotates the dispenser 34. The bottom end of the circular pipe 30 is connected to the dispensing spouts 28 where the pet food exits into the feeding plates 42.

Figure 3:
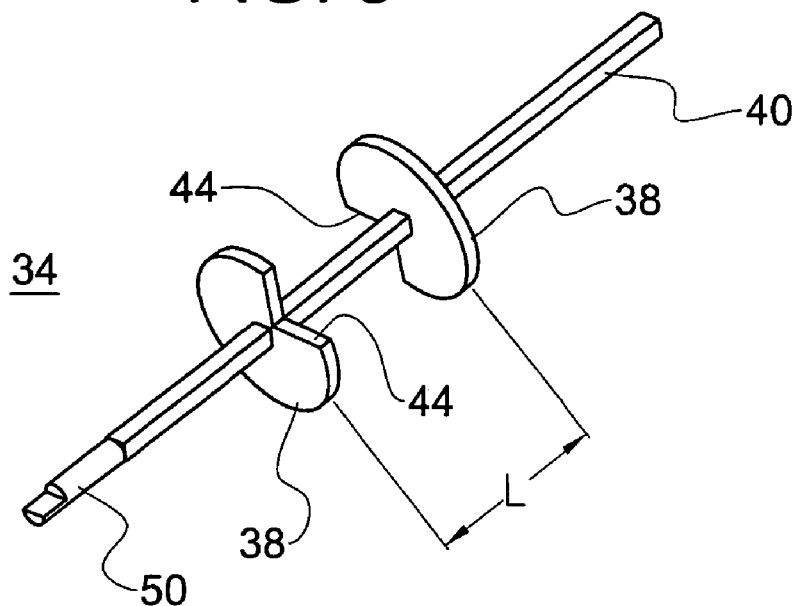
FIG. 3 is a perspective view of a shaft for use in connection with the present invention.
Figure 8:
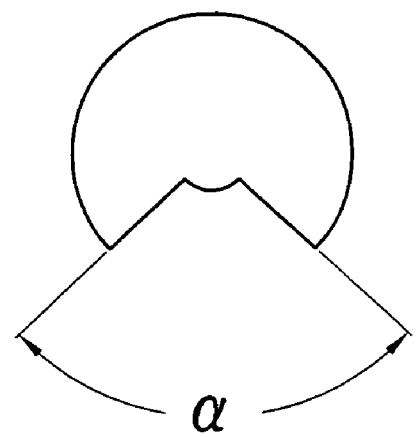
FIG. 8 is a top view of the dispensing disc.

As shown in FIG. 3, the dispenser 34 comprises a shaft 40 with a rectangular cross-section and two dispensing discs 38 fixed to the shaft 40. The shaft 40 runs perpendicularly through the center of each dispensing disc 38. The dispensing discs 38 each have an arc recess 44 of a predetermined angle α as shown in FIG. 8. Preferably, the predetermined α is about ninety (90) degrees. The distance L between the two dispensing discs 38 is about one and one-half (1½) inches. The arc recesses 44 on opposite sides of one another are about one hundred eighty (180) degrees apart. Pet food grains are moved by gravity through the arc recesses 44 of the rotating dispenser 34. When the dispenser 34 stops rotating, dispensing of pet food also stops due to friction of grains with the circular pipe 30 and the dispensing discs 38 and because the circular recesses 34 are arranged opposite with respect to the shaft 40.

Figure 4:
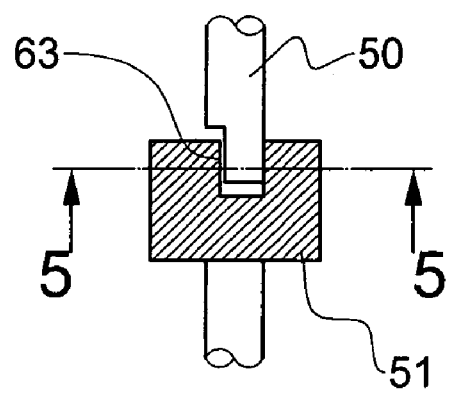
FIG. 4 is an enlarged detailed cross-sectional view of "A" of the pet food dispensing device of FIG. 1 showing the relationship between the shaft and a sleeve.
Figure 5:
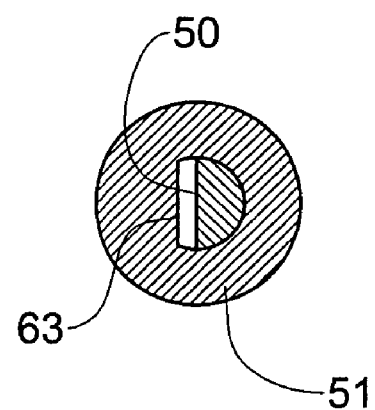
FIG. 5 is an enlarged detailed cross-sectional view of the shaft and sleeve taken along line 5—5 of FIG. 4.

The shaft 40 has a bottom end 50 that has the shape of a half-circle. The bottom end 50 is fitted into a sleeve 51 that has a receiving recess 63. As shown in FIG. 4, there is a small gap between the bottom end 50 and the receiving recess 63 provided by partially flattened circle shape of the receiving recess 63 as shown well in FIG. 5. This gap induces some rattling of the dispenser 34, and stirs pet food grains. The rectangular shaft 40 also stirs pet food grains since radial distance between the shaft 40 and the circular pipe 30 changes as the shaft 40 is rotated. These stirring effects facilitates dispensing flow of pet food. Jamming is effectively prevented since pet food grains are actively stirred by the rotation of the dispenser 34 and drop through the arc recesses 44 rather than being forced to move by a feeding screw.

Referring back to FIG. 2, a driven bevel gear 60 with 48 teeth is attached parallel to the sleeve 50 via a pin 64. The pin 64 is secured by an upside down L-shape bracket 62. The driven bevel gear 60 engages with a driving bevel gear 65 having 16 teeth and connected the motor 36, thereby providing 3 to 1 speed reduction. The rotation of the motor 36 prompts the rotation of the gear 60 and all parts connected to the gear 60, including the pin 64, sleeve 50, shaft 40, dispensing discs 38 and the entire dispenser 34.

Figure 6:
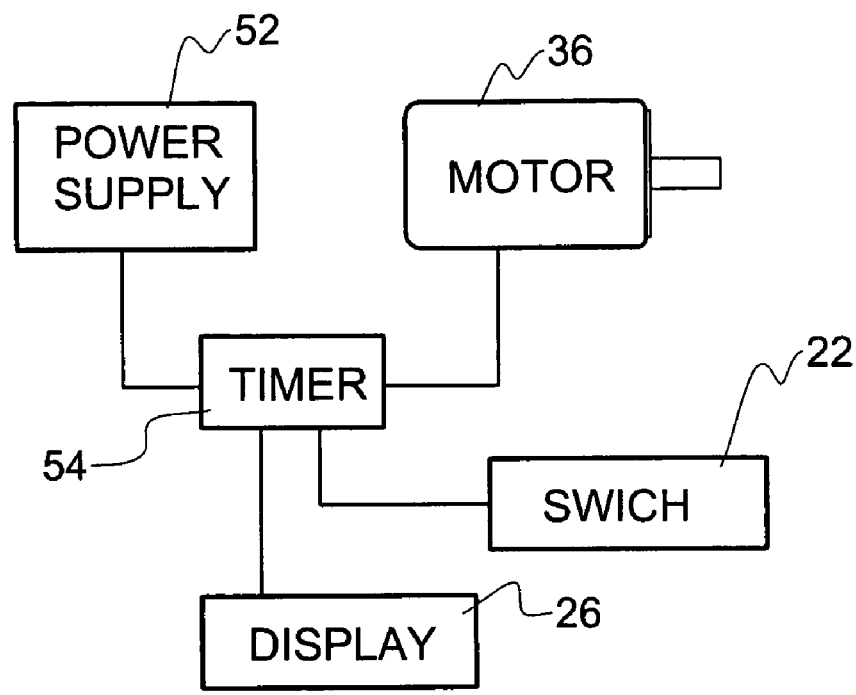
FIG. 6 is a block diagram of the electrical scheme of the present invention.

FIG. 6 shows timed operation of the automatic pet food dispensing device 10. The power switch 22 triggers either the motor 36 or the timer 54. The timer 54 is electrically connected to the motor 36 and the display 26. The display 26 shows the time that has been set for the automatic pet food dispensing device 10 to turn on. The power supply 52 supplies power to the motor 36 and the timer 54. The power supply 52 can be energized by either a battery or an AC outlet.

Figure 7:
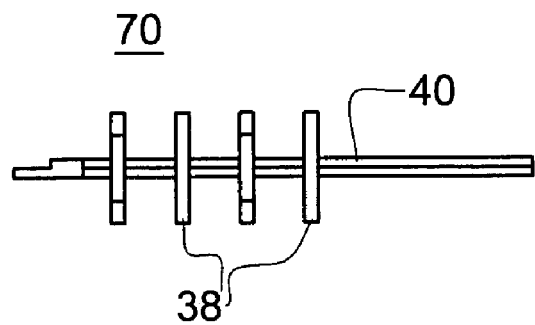
FIG. 7 is an elevation view of the shaft and dispensing discs.

FIG. 7 shows another dispenser 70 that has four dispensing discs 38. The arc recesses 44 of the dispensing discs 38 are arranged so that they do not overlap with one another. The increased number of the discs 38 increases the precision of the dispensed amount.

Figure 9:
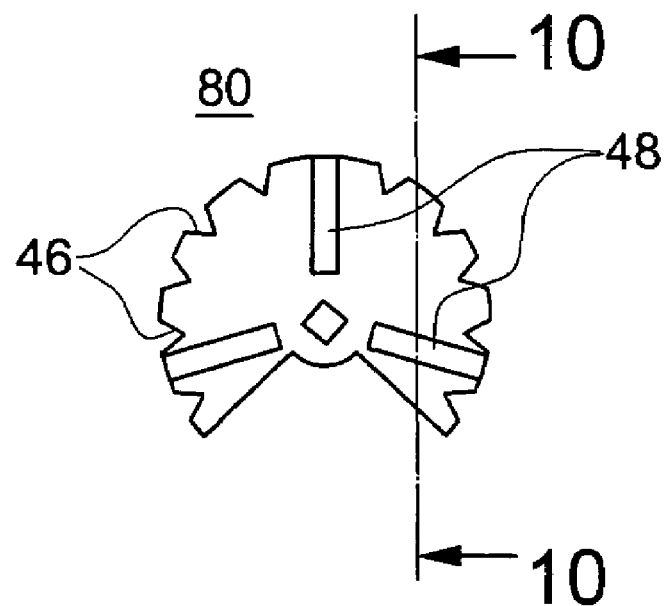
FIG. 9 is a top view of another embodiment of the dispensing disc.
Figure 10:
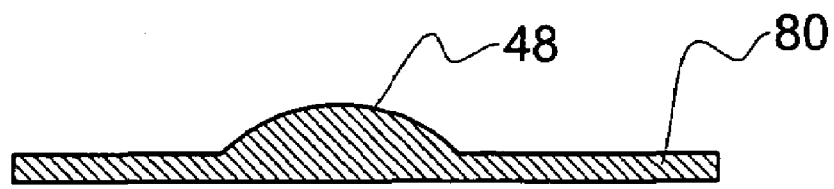
FIG. 10 is a cross-sectional view of the dispensing disc along line 10—10 of FIG. 9.

FIGS. 9 and 10 show another embodiment of a dispensing disc 80. The dispensing disc 80 has evenly spaced grooves 46 cut out around the circumference. The grooves 46 provide additional space between the dispensing discs 80 and the circular tube 30 to allow for crumbs of the pet food to fall to the dispensing spouts 28 instead of jamming and slows down the rotation of the dispenser 34.

The dispensing disc 80 also has evenly spaced radial convex bumps 48 slightly protruding upward therefrom. As the dispensing disc 38 is rotated, the bumps 48 move grains of pet food up and down, and thus stir the grains. This facilitates smooth and fast dispensing of pet food.

To use the automatic pet food dispensing device 10, place the container 12, with the open upper end 58 facing upward in the open upper top portion 66 of the case member 14, and deposit pet food in the open upper end 58. A feeding plate 42 should be placed under the dispensing spout 28. The operator of the automatic pet food dispensing device 10 may either push the power switch 22 to turn the automatic pet food dispensing device 10 on or push the programming buttons 24 using the display 26 to set the timer 54. The pet will have food according in the feeding plate 42 according to the timer or the operator's turning the automatic pet food dispensing device 10 on.

Although the invention has been shown and described in considerable detail and are pointed out in the annexed claims, other versions are possible by converting the aforementioned construction. Therefore, the scope of the invention shall not be limited by the specification specified above.

What is claimed is:

1. An automatic pet food dispensing device comprising:
   a) a container that stores pet food;
   b) a circular pipe attached below the container;
   c) a dispenser rotatably received in the circular pipe;
   d) a motor that rotates the dispenser; and
   e) one or more dispensing spouts connected to the circular pipe;
   wherein the dispenser comprises a shaft and two circular dispensing discs rigidly affixed to the shaft and rotatable therewith, wherein each of the dispensing discs compromises an arc recess of predetermined angle, wherein the arc recesses of the dispensing discs are positioned opposite with respect to each other.

2. The automatic pet food dispensing device of claim 1, wherein the distance between the two dispensing discs is about one and half (1½) inches.

3. The automatic pet food dispensing of claim 1, wherein the dispensing discs further comprise evenly spaced grooves cut out around the circumference of each disc.

4. The automatic pet food dispensing device of claim 1, wherein each of the dispensing discs further comprised one or more convex bumps protruding upward therefrom.

5. The automatic pet food dispensing device of claim 1, wherein the shaft has a rectangular cross section.

6. The automatic pet food dispensing device of claim 1, wherein one end of the shaft is connected to the motor via a sleeve, where the end of the shaft has a shape of a half a circle, wherein the sleeve comprises a receiving recess that receives the end of the shaft, wherein the receiving recess has a shape of a partially flattened circle so that there is a gap between the end of the shaft and the receiving recess.

7. The automatic pet food dispensing device of claim 1, wherein the predetermined angle of the arc recesses is about ninety (90) degrees.

8. The automatic pet food dispensing device of claim 1, wherein the container has a shape of an inverted cone, wherein the container comprises an upper open end and a lower open end, wherein the lower open end is connected to the circular pipe, wherein the upper open end comprises a peripheral edge, wherein the cross section of the peripheral edge has a shape of a half circle that is open downward.

9. The automatic pet food dispensing device of claim 8, further comprising a case member that encloses the container, the circular pipe, the dispenser, the motor, and the dispensing spouts, wherein the case member comprises an open upper top portion, wherein the peripheral edge of the container is spaced from the open upper top portion.

10. The automatic pet food dispensing device of claim 9, wherein the case member further comprises one or more hooks whereby bowls can be attached to the case member with the hooks.

11. The automatic pet food dispensing device of claim 1, further comprising a power supply that supplies power to the motor, a timer, a switch and a display, wherein the timer controls operation time of the motor, wherein the switch sets the timer, and wherein the display displays parameters for setting the timer.

12. An automatic pet food dispensing device comprising:
   a) a container that stores pet food;
   b) a circular pipe attached below the container;
   c) a dispenser rotatably received in the circular pipe;
   d) a motor that rotates the dispenser; and
   e) one or more dispensing spouts connected to the circular pipe;
   wherein the dispenser comprises a shaft and two or more circular dispensing discs rigidly affixed to the shaft and rotatable therewith, wherein each of the dispensing discs comprises an arc recess of predetermined angle, wherein the arc recesses of the dispensing discs do not overlap with one another.

13. The automatic pet food dispensing device of claim 12, wherein the shaft has a rectangular cross section.

14. The automatic pet food dispensing device of claim 12, wherein on end of the shaft is connected to the motor via a sleeve, wherein the end of the shaft has a shape of a half circle, wherein the sleeve comprises a receiving recess that receives the end of the shaft, wherein the receiving recess has a shape of a partially flattened circle so that there is a gap between the end of the shaft and the receiving recess.

15. The automatic pet food dispensing device of claim 12, wherein the predetermined angle of the arc recesses is about ninety (90) degrees.

16. The automatic pet food dispensing device of claim 12, wherein the container has a shape of an inverted cone, wherein the container comprises an upper open end and a lower open end, wherein the lower open end is connected to the circular pipe, wherein the upper end comprises a peripheral edge, wherein the cross section of the peripheral edge has a shape of a half circle that is open downward.

17. The automatic pet food dispensing device of claim 16, further comprising a case member that encloses the container, the circular pipe, the dispenser, the motor, and the dispensing spouts, wherein the case member comprises an open upper top portion, wherein the peripheral edge of the container is spaced from the open upper top portion.

18. The automatic pet food dispensing device of claim 17, wherein the container further comprises an extender, and the extender comprises a fixed annular member and a movable annular member that is received in the fixed annular member when the container is not extended, and extended upward from the fixed annular member when the container is extended.

* * * * *